A. BALLENBERG.
CASTER.
APPLICATION FILED SEPT. 16, 1915.
1,170,502. Patented Feb. 8, 1916.
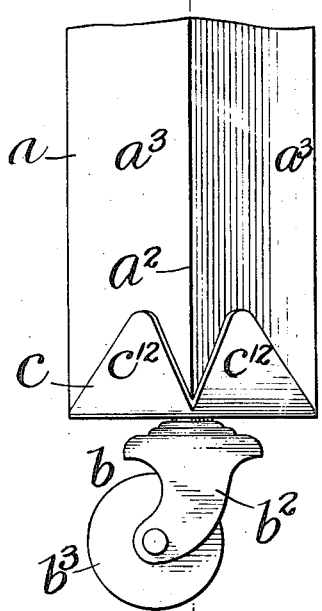
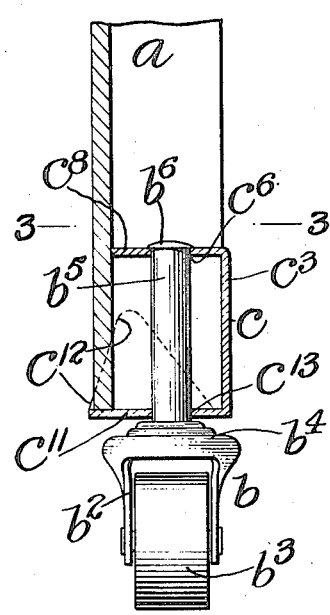
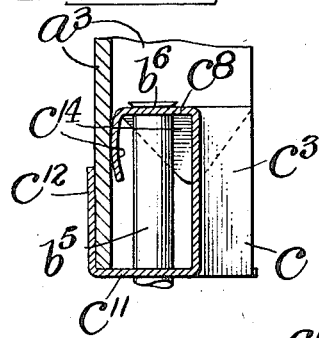
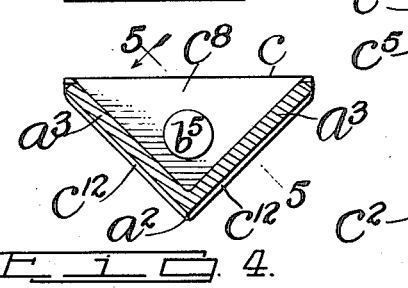
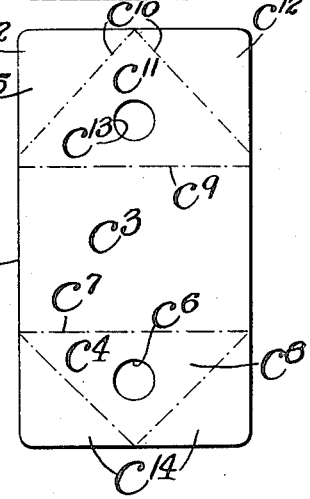
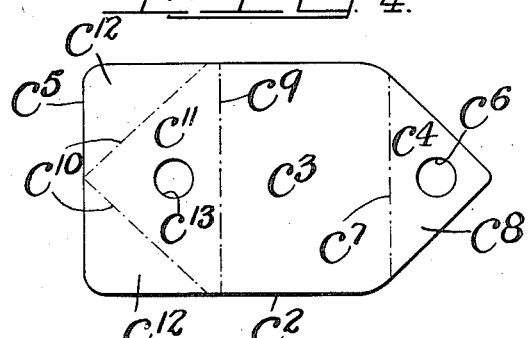
Witnesses:
H. E. Thompson
C. Mulreany
Inventor
Adolph Ballenberg
By his Attorneys
Edgar Tate & Co

UNITED STATES PATENT OFFICE.

ADOLPH BALLENBERG, OF NEW YORK, N. Y.

CASTER.

1,170,502.

Specification of Letters Patent.   Patented Feb. 8, 1916.

Application filed September 16, 1915.   Serial No. 50,937.

*To all whom it may concern:*

Be it known that I, ADOLPH BALLENBERG, a citizen of the United States, and residing at New York, in the county of New York and State of New York, have invented certain new and useful Improvements in Casters, of which the following is a specification, such as will enable those skilled in the art to which it appertains to make and use the same.

This invention relates to what are known as roller casters for use in connection with household furniture and other articles of various kinds and classes in order to facilitate the movement of such articles from one point to another; and the object of this invention is to provide an improved caster of this class designed particularly for use in connection with metallic furniture, or furniture having metallic legs which are angular in cross section, or composed of what is known as angle iron.

The invention is fully disclosed in the following specification, of which the accompanying drawing forms a part, in which the separate parts of my improvement are designated by suitable reference characters in each of the views, and in which:—

Figure 1 is a corner view of a leg of a piece of furniture provided with my improved caster; Fig. 2 a section on the line 2—2 of Fig. 1; Fig. 3 a section on the line 3—3 of Fig. 2; Fig. 4 a plan view of a blank from which a clamp attaching device which I employ is made; Fig. 5 a section on the line 5—5 of Fig. 3 and showing a modified form of clamp attaching device; and, Fig. 6 a plan view of a blank from which the clamp attaching device shown in Fig. 5 is made.

In the drawing forming part of this specification, I have shown at $a$ one leg of an article of furniture of the class specified, said leg being composed of what is known as angle iron, and having a corner $a^2$ and two similar sides $a^3$. I have also shown at $b$ an ordinary caster, comprising the yoke member $b^2$ in which the roller $b^3$ is mounted and the cross head portion $b^4$ of which is provided with the usual pintle $b^5$.

In the practice of my invention, as shown in Figs. 1, 2, 3, and 4, I provide an attaching member $c$ formed from a sheet $c^2$ of metal shown in Fig. 4, and said sheet comprises a central body portion $c^3$ having a triangular side member $c^4$ and a rectangular side member $c^5$, and the triangular side member $c^4$ is provided with an aperture $c^6$ and is folded on the line $c^7$ to form an inwardly directed triangular member $c^8$ which fits snugly within the angle of the leg $a$ as shown in Fig. 3.

The rectangular side member $c^5$ is adapted to be folded on a line $c^9$ and is provided with two folding lines $c^{10}$ which divide the member $c^5$ into a triangular body part $c^{11}$ and two triangular corner members $c^{12}$, and the body part $c^{11}$ is folded inwardly to form the bottom of the attaching member $c$, while the triangular members $c^{12}$ are folded to form side clips which overlap the sides $a^3$ of the leg, as clearly shown in Fig. 1, and the central body part $c^{11}$ of the rectangular side member $c^5$ is provided with a central aperture $c^{13}$.

The pintle $b^5$ of the caster $b$ passes upwardly through the aperture $c^{13}$ and the aperture $c^6$ and is riveted as shown at $b^6$, and this binds the caster to or in the attaching member $c$, while permitting it to freely rotate therein, and the parts $c^{12}$ which overlap the sides of the leg $a$ have a spring action which securely clamp and bind the attaching member $c$ to the leg, but which at the same time permit of the detachment from the leg of the caster, including the attaching member $c$, whenever necessary, and in this way I provide a caster which may be quickly and easily connected with the legs of an article of furniture, and which will remain securely in place while the article of furniture is in use, but which may also be quickly and easily detached for any purpose.

With my improvement no screws, bolts, rivets or other devices are necessary to secure the caster in position, and the said caster when once applied, as shown and described, will remain in connection with the leg until it is forcibly detached.

In the construction shown in Fig. 5, the clamp attaching device $c$ is of slightly different form from that shown in Figs. 1, 2 and 3, and is made from the blank shown in Fig. 6, which differs from the blank shown in Fig. 4 in that it is rectangular in form, and the triangular end portion $c^4$ which forms the top part $c^8$ of the spring attaching device is provided with supplemental triangular folding members $c^{14}$ which are folded downwardly as shown in Fig. 5 to form supplemental clamp devices which bear on the inner walls of the side portions $a^3$ of the leg or support, and with this construction the spring clamp devices $c^{14}$ operate in connection with the spring clamp devices $c^{12}$ to securely bind and hold the attaching member of the caster in the leg or support.

Although, I have shown and described my improved attaching device as particularly adapted for use in connection with what are known as angle legs or supports for various articles, my invention is not limited to this use in connection with the form of angle leg or support herein shown and described, and my invention may be used in connection with legs or supports of other forms in cross section.

From the foregoing description it will be seen that the attaching member $c$, as herein shown and described, consists of a rectangular back portion formed by the body part $c^3$ of the blank, an angular top portion which fits in the angle of the leg, an angular bottom portion on which the leg rests, and the triangular spring clip or binding device which extend upwardly from the bottom portion, or upwardly from the bottom portion and downwardly from the top portion, and bear on the sides of the leg, as clearly shown, and while I have shown and described the preferred form of my improvement, my invention is not limited to the exact details thereof, and changes therein and modifications thereof may be made, within the scope of the appended claims, without departing from the spirit of my invention or sacrificing its advantages, and it will also be apparent that my invention is not limited to the idea of connecting the caster with the attaching device by means of a pintle which passes upwardly through said device, and said device, and said caster may be connected with said attaching device in other ways.

Having fully described my invention, what I claim as new and desire to secure by Letters Patent, is:—

1. The herein described attaching device for connecting casters with a furniture leg composed of angle iron, consisting of a back plate, a top plate which extends backwardly into the angle of the leg, a bottom plate in which the leg rests and upwardly directed clamping members connected with the bottom plate and which overlap the sides of the leg.

2. An attaching device for use in connection with an angular support, said attaching device being formed from sheet metal and consisting of a bottom plate on which the support rests, a back plate and a top plate, said bottom plate being provided with upwardly directed clamping members and said top plate with downwardly directed clamping members.

3. An attaching device for securing a caster to an angular leg, said caster being provided with a pintle on which the attaching device is mounted and said attaching device consisting of a bottom plate on which the leg rests, a top plate connected with the bottom plate and which fits in the angle of the leg, and means for detachably securing said device in and to the leg, consisting of upwardly directed spring clamp devices connected with the bottom plate and which overlap the sides of the leg.

4. An attaching device for securing a caster to an angular leg, said caster being provided with a pintle on which the attaching device is mounted and said attaching device consisting of a bottom plate on which the leg rests, a top plate connected with the bottom plate and which fits in the angle of the leg, and means for detachably securing said device in and to the leg, consisting of upwardly directed spring clamp devices connected with the bottom plate and which overlap the sides of the leg, and other clamp devices connected with the top plate and operating inside of the leg.

5. An attaching device for the support of an article of furniture or other article, said attaching device consisting of a bottom plate on which the support rests, a top plate formed integral with the bottom plate, spring clamp devices integral with the bottom plate and which overlap the sides of the support and other clamping members for detachably securing said device in and to the support.

6. A device of the class described for the support of an article of furniture or other article, said device consisting of a bottom plate on which the support rests, a top plate formed integral with the bottom plate and adapted to be inserted into said support, spring clamp devices integral with the bottom plate and which overlap the sides of the support and other clamping members formed integral with said device for holding it in and to said support, said device being adapted to receive an attachment.

In testimony that I claim the foregoing as my invention I have signed my name in presence of the subscribing witnesses this 14th day of September, 1915.

ADOLPH BALLENBERG.

Witnesses:
C. MULREANY,
H. E. THOMPSON.